ns

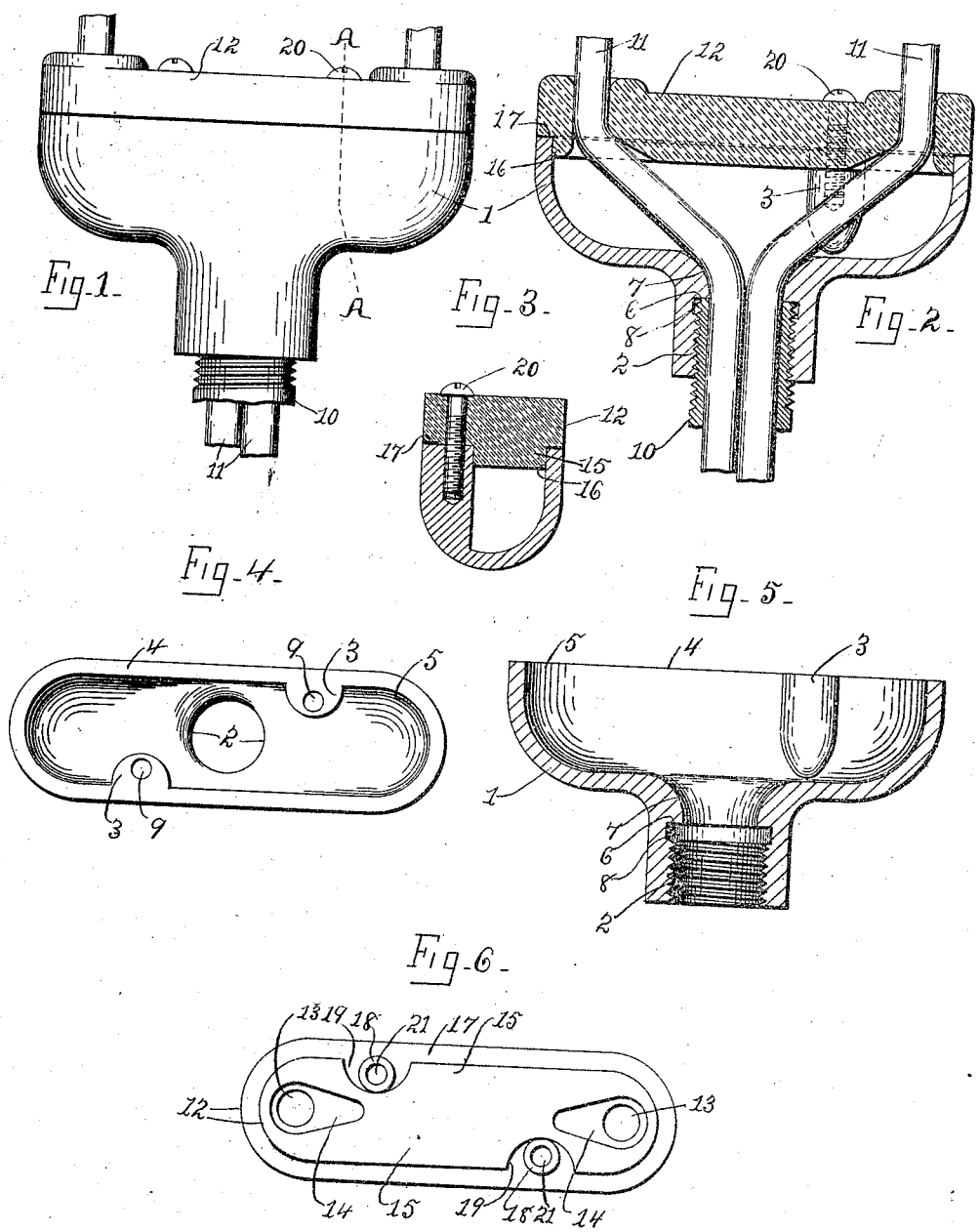

UNITED STATES PATENT OFFICE.

ALBERT F. HILLS, OF SYRACUSE, NEW YORK, ASSIGNOR TO CROUSE-HINDS COMPANY, OF SYRACUSE, NEW YORK, A CORPORATION OF NEW YORK.

BRANCH BOX.

No. 858,288.　　　　　Specification of Letters Patent.　　　　Patented June 25, 1907.

Application filed October 19, 1905. Serial No. 283,388.

*To all whom it may concern:*

Be it known that I, ALBERT F. HILLS, of Syracuse, in the county of Onondaga and State of New York, have invented a certain new and useful Branch Box, of which the following is a specification.

My invention has for its object the production of a branch box for electric wires, which is particularly applicable for exposed conduit-work, and is simple and economical in construction and highly efficient and durable in use; and to this end, it consists in the novel combinations and means hereinafter set forth and claimed.
In describing this invention, reference is had to the accompanying drawing, in which like characters designate corresponding parts in all the views.

Figure 1 is an elevation of a preferable construction of my branch box, a pair of wires being shown in operative relation thereto. Fig. 2 is a longitudinal sectional view, partly in elevation, of the parts illustrated in Fig. 1. Fig. 3 is a transverse sectional view, partly in elevation, on line A—A, Fig. 1. Figs. 4 and 5 are, respectively, plan and longitudinal sectional view of the body of the branch box. Fig. 6 is an inverted plan of the closure.

The body 1 of my branch box is preferably hollow, elongated, and composed of metal, and is formed with an internal chamber for branching of wires, and with one side open, another side of the body being formed with a passage 2 communicating with the internal chamber. Ribs 3 are provided on the inner face of the body, said face and ribs being arranged at an angle to the open side of the body, and the ribs having their outer ends substantially coincident with the external surface 4 surrounding the opening 5 of said open side. The body 1 is also provided with a shoulder 6 projecting into the passage 2 at the inner end thereof, and with an internal surface 7 inclining from the shoulder 6 toward the inner surfaces of the body 1, which terminate at the exposed surface 4 of the body, opposing portions of the surface 7 diverging inwardly from the shoulder 6 toward opposing walls, as the ends, of the body 1.
An annular groove 8 is formed in the wall of said passage 2 at the outer side of the shoulder 6. As illustrated, the ribs 3 are formed with threaded sockets 9, and are arranged on opposite sides of the body 1 between the ends thereof. A conduit 10 for incasing wires 11 is supported within the passage 2 at the outer side of the shoulder 6, the inner end of the conduit 10 projecting into the groove 8, and contiguous surfaces of said conduit and the wall of the passage 2 being threaded for facilitating securement and detachment of the conduit.

As will be apparent to those skilled in the art, the diameter of the interior of the conduit 10 is preferably substantially the same as that of the contiguous portion of the shoulder 6, in order that the shoulder 6 may serve substantially as a perforated cap at the inner end of the conduit 10 for preventing cutting of the wires 11, and particularly of the insulation thereof, upon the edge of said conduit 10 as the wires emerge from the conduit and pass at an angle to each other over surfaces diverging from the shoulder 6.

Although in the illustrated construction of my branch box the passage 2 is shown as disposed opposite to the open side of the body, and within the planes of sides of the body arranged at an angle to said open side, it is obvious that my branch box may be provided with one or more passages extending either laterally or longitudinally.

The closure 12 for the open side of the body is formed of a single elongated piece of insulation, as porcelain, and is provided with perforations 13 in its ends for the wires 11, and with faces 14 converging from opposing sides of the perforations 13 toward the central part of the inner face of the closure and here shown as formed by grooves which decrease in depth from the perforations 13. Said perforations 13 permit the passage of the wires 11 through the closure 12 and also properly space the wires, and said faces 14 prevent undue bending and straining of the wires during the manipulation thereof. The closure 12 is also provided with a portion 15 of reduced size inserted into the opening 5 and having a surface 16 engaged with, or opposed to, the inner face of the body, said surface being arranged at an angle to the inner face 17 of the closure surrounding said reduced portion 15.

In the illustrated exemplification of my invention, the closure 12 is provided with raised faces 18 for engaging opposing faces of the body and separating the greater portion of the surface 17 of the closure and the opposing surface 4 of the body, the closure 12 being preferably formed in the longitudinal sides of the reduced portion 15 and between the perforations 13, with cutouts 19 which receive the ends of the ribs 3, and the faces 18 being provided in the cutouts 19 by bosses which rest upon the ends of the ribs 3. Screws 20 extend through openings 21 in the closure 12 and said bosses into the sockets 9 in the ribs 3 and secure said closure to the body 1.

As will be obvious, my branch box may be cheaply manufactured and assembled. Moreover, by constructing the closure 12 with the cutouts 19 and the raised faces 18 as described, the liability of breakage of the closure, during the securing of the same in position, is reduced to a minimum. Also injury of the wires is reduced to a minimum by the shoulder 6, the diverging portions of the surface 7, and the faces 14, since the wires passing between the conduit 10 and the perforations 13 engage opposing diverging portions of the inclining surface 7, and the inclining faces 14 with a minimum liability of cutting or abrasion of said wires, or their insulation, upon sharp edges, and without the necessity of abrupt bends in the wires.

The construction and operation of my branch box will now be readily understood upon reference to the foregoing description and the accompanying drawing.

Having thus fully described my invention, what I claim as new and desire to secure by Letters Patent, is:—

1. The combination of a branch box comprising a hollow metallic body having an internal chamber for branching of wires, said body being formed with one side open, and having another side formed with a passage provided with an inwardly projecting shoulder, and surfaces diverging inwardly from said shoulder toward opposing walls of the body, and a closure of insulating material for the open side of the body, the closure having perforations for permitting the passage of the wires through the closure and spacing said wires, and also having faces converging from opposing sides of the perforations inwardly toward the center of the closure, and a conduit supported within the passage at the outer side of the shoulder, said conduit serving to incase wires passing through the conduit and diverging therefrom and passing over said diverging surfaces of the body and the converging faces of the closure through the perforations in said closure, substantially as and for the purposes set forth.

2. A branch box for wires, comprising a hollow body formed with one side open, a closure of insulating material for the open side of the body, said closure having perforations for permitting the passage of the wires through the closure and spacing the wires, and said closure being provided with surfaces arranged at an angle to each other for respectively engaging the inner face of the body and an external face of the open side thereof, the greater portion of the external surface surrounding the opening of said open side being separated from the opposing surface of the closure and means for securing the closure to the body, said means being arranged in proximity to a portion of said external surface in contact with the opposing surface of the closure, substantially as and for the purpose set forth.

3. A branch box for wires, comprising two elements, one a hollow body formed with one side open, and the other, a closure for the open side of the body, said closure having perforations for permitting the passage of the wires through the closure and spacing the wires, said closure being provided with surfaces arranged at an angle to each other and respectively opposed to the inner face of the body and the external surface of the open side thereof, one of said elements having raised faces for engaging opposing faces of the other element substantially as and for the purpose described.

4. A branch box for wires, comprising a hollow body formed with one side open, and having its inner face provided with ribs arranged at an angle to the open side of the body, a closure of insulating material for said open side, the closure having perforations for permitting the passage of the wires through the closure and spacing the wires and raised faces for engaging the outer ends of the ribs and means for securing the closure to the body at said ribs, substantially as and for the purpose specified.

5. A branch box for wires, comprising a hollow body formed with one side open, and having its inner face provided with ribs arranged at an angle to the open side of the body, a closure of insulating material for said open side, the closure being formed with a reduced portion inserted into the opening of said open side and having perforations for the wires, said closure being also formed with raised faces for engaging the outer ends of the ribs and means for securing the closure to the body at said ribs, substantially as and for the purpose set forth.

6. A branch box for wires, comprising a hollow body formed with one side open, and having its inner face provided with ribs arranged at an angle to the open side of the body, a closure of insulating material for said open side, the closure being formed with a reduced portion inserted into the opening of said open side, and having perforations for permitting the passage of the wires through the closure and spacing the wires, said closure having cutouts for receiving the ribs and means for securing the closure to the body at said ribs, substantially as and for the purpose described.

7. A branch box for wires, comprising a hollow elongated body formed with one side open, and having its inner face provided with ribs arranged at an angle to the open side of the body, an elongated closure of insulating material for said open side, the closure being formed with a reduced portion inserted into the opening of said open side, and having perforations in its ends for permitting the passage of the wires through the closure and spacing the wires, said closure having cutouts in the intermediate portions of its longitudinal sides between the perforations, the cutouts receiving the ribs and being formed with raised faces for engaging the outer ends of the ribs, and said closure having portions of its inner surface separated from the opposing surface of the body, and means for securing the closure to the body, said means being passed through the closure and the raised faces thereof into the ribs, substantially as and for the purpose specified.

8. In a branch box for wires, a hollow body formed with one side open, and a closure of insulating material for the open side of the body, said closure having perforations for permitting the passage of the wires through the closure and spacing the wires an inner surface of the closure having grooves leading from the opposing sides of the perforations, and decreasing in depth from said perforations, substantially as and for the purpose described.

9. A branch box for wires, comprising an elongated body formed with one side open, and having its opposite side formed with a substantially central passage provided with an inwardly projecting shoulder and with an annular groove at the outer side of the shoulder, said body having an internal surface inclining from the shoulder, a closure of insulating material for the open side of the body, the closure having perforations at opposite sides of the axis of the passage, for permitting the passage of the wires through the closure and spacing the wires an inner surface of the closure having grooves leading from the opposing sides of the perforations and decreasing in depth from the perforations, the grooves receiving the wires, and a conduit supported within the passage at the outer side of the shoulder and projecting into the annular groove, said conduit serving to incase wires passing over the shoulder between the conduit and the perforations, substantially as and for the purpose described.

In testimony whereof, I have hereunto signed my name in the presence of two attesting witnesses, at Syracuse, in the county of Onondaga, in the State of New York, this 17th day of October, 1905.

ALBERT F. HILLS.

Witnesses:
S. DAVIS,
F. G. BODELL.